United States Patent
Sanders

[15] 3,679,083
[45] July 25, 1972

[54] APPARATUS FOR TRANSFERRING A VEHICLE TO AND FROM AN ELEVATOR

[72] Inventor: Duane V. Sanders, Spokane, Wash.
[73] Assignee: Systematic Multi-Level Parking Company, Seattle, Wash.
[22] Filed: May 10, 1971
[21] Appl. No.: 143,686

Related U.S. Application Data

[63] Continuation of Ser. No. 704,096, Feb. 8, 1968, abandoned.

[52] U.S. Cl. ............................................................214/730
[51] Int. Cl. ...................................B66f 9/14, E04b 6/06
[58] Field of Search...................................................214/730

[56] References Cited

UNITED STATES PATENTS

| 3,366,254 | 1/1968 | Peter | 214/16.1 |
| 3,439,815 | 4/1969 | Wagner et al | 214/730 |

*Primary Examiner*—Gerald M. Forlenza
*Assistant Examiner*—R. B. Johnson
*Attorney*—Morgan, Finnegan, Durham & Pine

[57] ABSTRACT

This invention relates to a self-contained apparatus for extending an object from a central point in one of a plurality of directions and particularly to a new and improved automobile parking apparatus. The apparatus is mounted on an elevator and operates to direct a dolly having an automobile supported thereon into a stall on either side of the elevator. The apparatus includes fluid drive means coupled to the dolly through a unique pulley arrangement which multiplies the movement of the drive means to extend the dolly into a predetermined stall as desired.

4 Claims, 5 Drawing Figures

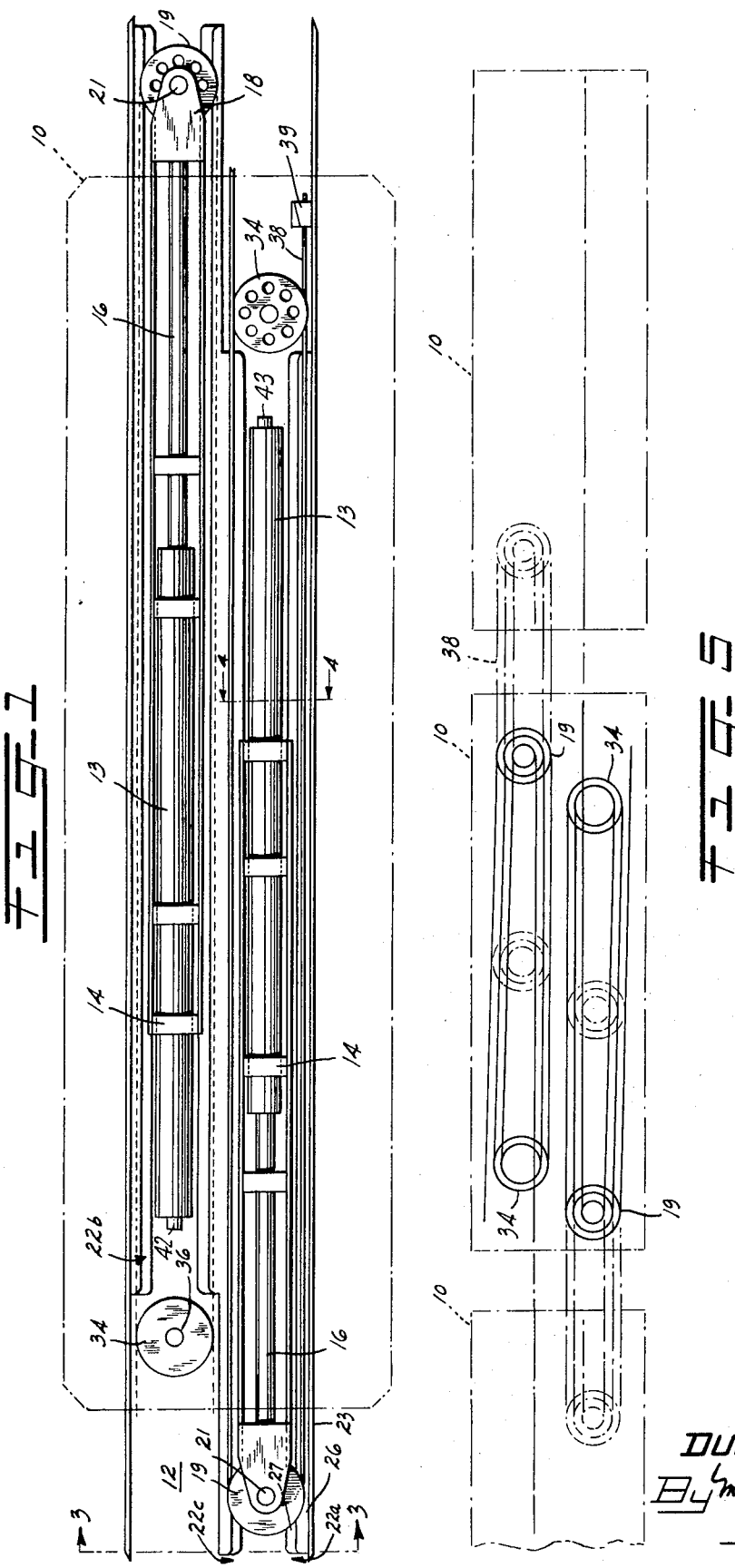

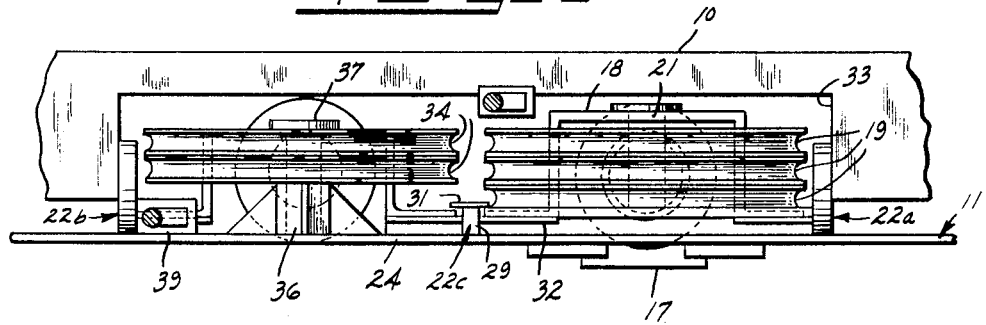
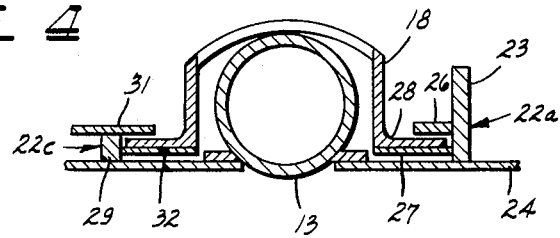
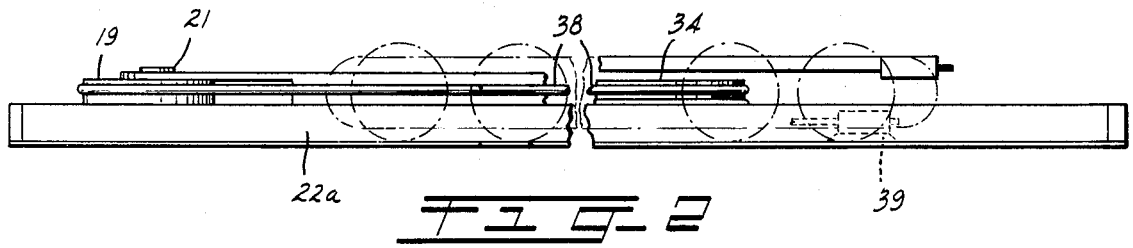

APPARATUS FOR TRANSFERRING A VEHICLE TO AND FROM AN ELEVATOR

This application is a continuation of Ser. No. 704,096, filed 2/8/68 which is now abandoned.

BACKGROUND OF THE INVENTION

One solution to the problem of automobile parking in congested cities has been to provide large multi-story parking garages. The use of ramps to transport a vehicle to a parking location within such garages wastes valuable space and time and, consequently, numerous elevator-type garages have been designed to eliminate the drawbacks of these conventional garages. A typical elevator-type garage comprises banks of storage compartments or parking stalls located on opposite sides of an elevator hoistway. The elevators are designed to lift vehicles to a predetermined height and along the hoistway or aisle into line with a selected stall. The elevators also include apparatus which moves the vehicle into the stall as directed to complete the parking operation.

Automatic parking apparatus of the type discussed above is disclosed in U.S. Pat. Nos. 2,815,136 to V. K. Mayer and 2,873,864 to G. Kavanagh. These patents show particular parking apparatus having hydraulic actuating means for moving a vehicle parking dolly into a designated stall. The present invention, however, pertains to a unique parking apparatus of a self-contained type which may extend an object such as a wheeled dolly from a central point without the use of external means. The apparatus is superior in performance to previously known parking apparatus and relatively inexpensive to construct, operate and maintain.

SUMMARY OF THE INVENTION

Accordingly, an object of this invention is to provide an apparatus for extending an article from a central point without the aid of external means. More specifically, the invention is intended to provide a new and improved automobile parking apparatus for transferring dolly mounted vehicles into parking spaces on either side of an elevator.

With the above and other objects and advantages in view, the present invention pertains to a unique vehicle parking apparatus. The apparatus comprises a main frame portion for supporting a vehicle dolly and having at least one stationary sheave mounted thereto. Separate fluid drive means are coupled to the dolly for each direction of travel through a traveling sheave which is in turn connected to a stationary sheave by means of a cable or wire rope. The sheaves are arranged so that the dolly movement is a predetermined multiple of the movement of the drive means.

In operation, the fluid drive means corresponding to a particular direction is actuated to drive and the traveling sheave and hence the dolly in said direction. The sheaves are arranged to provide an enlarged movement of the dolly into the parking stall where the vehicle is deposited. After the vehicle has been parked, the apparatus retracts for a subsequent parking operation. The vehicle removal operation is similar in nature and the same principles apply thereto.

BRIEF DESCRIPTION OF THE DRAWINGS

The features of the present invention will be more clearly understood in conjunction with the accompanying drawings wherein:

FIG. 1 is a plan view of the subject invention showing the vehicle parking apparatus;

FIG. 2 is a side view of the parking apparatus;

FIG. 3 is a view taken along the line 3—3 of FIG. 1;

FIG. 4 is a view taken along the line 4—4 of FIG. 1; and,

FIG. 5 shows a roping and extension diagram illustrating the operation of the invention.

DESCRIPTION OF THE PREFERRED EMBODIMENT

Referring now to the drawings, the invention comprises and article transfer apparatus capable of extending an object from a central point in one of a plurality of directions without the aid of external means. More specifically, the invention relates to an apparatus for extending a wheeled dolly 10 from a central position on a vehicle elevator 11 into a parking stall 12 on either side of the elevator hoistway. In a typical embodiment, the apparatus may be used to park automobiles in multi-story parking garages of the type disclosed in U.S. Pat. No. Re. 23,962 to L. K. Sanders et al or U.S. Pat. No. 2,901,129 to L. D. Sanders.

The apparatus includes a pair of oppositely directed hydraulic cylinders 13 which are mounted to the elevator 11 by means of connecting flanges 14 and to the dolly 10 through a connecting arrangement to be described hereinafter. The cylinders 13 are designed to move a dolly supported vehicle into a storage space on the side of the elevator 11 corresponding to the particular cylinder 13 being operated. Since each cylinder 13 is included within a similar transfer arrangement, the invention will be described with reference to only one such arrangement, it being understood that the other illustrated arrangement operates and is constructed in a similar fashion.

EAch cylinder 13 includes a cylinder or piston rod 16 which is driven back and forth upon operation by conventional actuating means (not shown) which is coupled thereto. The cylinder rod 16 may be connected at one end to an outboard shaft support 17 which in turn is mounted to a traveling guide and support frame 18. In another embodiment of the invention, there is the possibility that the outboard shaft support 17 may be omitted. The frame 18 ordinarily supports one or more traveling sheaves 19 which are rotatably mounted thereto by the axial member 21. The precise number of sheaves 19 depends upon the particular application.

The traveling sheaves 19 are directed along a path determined by the fixed guides 22a, 22b and 22c which engage the traveling guide and support frame 18. As shown in FIG. 4, the fixed guides comprise end guides 22a and 22b and center guide 22c. The end guides 22a and 22b each comprise vertical portions 23 mounted to the deck 24 at one end and having upper and lower portions 26 and 27, respectively extending inwardly at right angles from the vertical portion 23. The portions 26 and 27 are spaced a predetermined distance apart to accommodate the flange portion 28 of the traveling guide and support frame 18. The center guide 22c comprises a vertical portion 29 and upper horizontal portion 31 forming a "T" therewith and lower portions 32 extending outwardly on both sides of the vertical portion 29 to receive the flange 28 of the traveling guide and support frame 18.

The fixed guides 22a, 22b and 22c thus restrict the movement of the traveling guide and support frame 18. At the same time, the inner edge 33 of the dolly 10 engages the vertical portions 29 of the fixed guides 22a and 22b to limit the dolly movement in a transverse direction.

A plurality of fixed sheaves 34 are rotatably mounted on the member 36 with their axis parallel to the axis of the traveling sheaves 19. The vertical member 36 is mounted at one end to the deck 24 and includes the upper enlarged portion 37 to retain the sheaves 34 in place. The sheaves 19 and 34 are operatively connected by cable or wire rope 38 which is arranged in the manner shown diagrammatically in FIG. 5.

The cable 38 is connected at one end to the deck mounted cable hitch 39 and then wrapped about one of the traveling sheaves 19. The cable 38 is led back and forth between one of the fixed sheaves 34 and a corresponding traveling sheave 19. Since there is ordinarily one more traveling sheave 19 than fixed sheave 34, the cable 38 terminates from a traveling sheave 19 and extends past the deck mounted sheave 34 in an unoperated position to a deck mounted hitch 39. FIG. 5 illustrates the dolly 10 in either of two parking stalls as the traveling sheave 19 is moved outwardly from its rest position by the hydraulic cylinder 13. The distance covered by the dolly 10 is a multiple of the cylinder travel and in a typical embodiment may be in the ratio five to one though it is of course conceivable that other ratios may be employed. The direction of dolly movement is determined by operation of the cylinders 13 associated with that direction. Means may thus be provided so that the entire parking operation is performed and monitored automatically.

In 13 hydraulic pressure is applied to port 42 of cylinder 3 actuating the cylinder which drives the traveling sheaves 19 in the desired direction and initiates dolly travel in the same direction. After pressure has been applied to port 42 at the rear of one cylinder 13, port 43 at the rear of the other cylinder opens to the supply tank (not shown) allowing the sheaves 19 to retract at their reduces ratio with dolly 10 traveling 5 feet for every foot of cylinder travel. The fluid system interconnections are conventional and therefore will not be described in detail. The dolly 10 may be normally extended until the center axis of the sheaves 19 interferes with the dolly 10. The system also operates in a similar manner to remove an automobile from a parking stall.

In a typical embodiment, one of the cylinders 13 is actuated to drive a wheeled dolly 10 in the desired direction in order to move a vehicle into the selected parking space. No external means are required to operate the apparatus save for a power supply which operates cylinders 13. Hence, the apparatus is relatively compact and inexpensive to construct.

What has been described above are merely illustrative examples of the application of the principles of the invention. Numerous other arrangements may be readily devised by those skilled in the art which will embody the principles of the invention and fall within the spirit and scope thereof.

I claim:

1. Apparatus for transferring article carrying frame means from a carrier along deck means in a predetermined horizontal direction comprising:
    frame means on which an article may be carried, said frame means adapted to be movable in a predetermined horizontal direction along the deck means,
    movable sheave means for each direction of travel coupled to said frame means, and movable along said deck means within set limits, said sheave means each being rotatable about the axis thereof,
    stationary sheave means for each direction of travel adapted to be rotatably mounted to said deck means, each stationary sheave means for a given direction of travel having a cooperating movable sheave means in operative alignment therewith, the axis of rotation of each pair of cooperating sheave means being parallel to one another,
    cable means for each direction of travel, said cable means being fixedly mounted at one end to said frame means and extending to and about each movable sheave means and to its cooperating stationary sheave means and adapted to be mounted at its opposite end to the deck means, and
    drive means for each direction of travel mounted on said deck means and directly connected to each of said movable sheave means for moving said sheave means and hence frame means along the deck means in a given direction to effect a transfer operation, the movement of said frame means bearing a fixed relationship to the movement of said sheave means.

2. An apparatus for transferring article carrying frame means from a carrier in accordance with claim 1 wherein:
    said frame means comprises a movable wheeled dolly, said dolly being guided in either of two diametrically opposed directions from the carrier to accomplish a transfer operation.

3. Apparatus for transferring article carrying frame means in accordance with claim 2 which includes:
    a pair of oppositely directed drive means mounted to said dolly,
    a plurality of movable sheave means mounted to said dolly and coupled to each of said drive means, said sheave means being rotatable about the axis thereof,
    A plurality of stationary sheave means corresponding to each plurality of movable sheave means adapted to be rotatably mounted to the deck means, and
    a separate cable for each direction of dolly movement adapted to be fixedly mounted at one end to the deck means and extending about one of the movable sheave means and thence to one of the stationary sheave means and then extending between subsequent movable and stationary sheave means, the cable finally extending from the last movable sheave means to the wheeled dolly to be mounted thereto,
    said movable sheave means and stationary sheave means being so arranged that the movement of the wheeled dolly is a predetermined multiple of the movement of the movable sheave means.

4. An apparatus for transferring article carrying frame means in accordance with claim 3 wherein:
    each plurality of movable sheave means includes one more sheave than the corresponding plurality of stationary sheave means to permit the cable to terminate from a movable sheave to the dolly, and
    the drive means comprises a pair of oppositely directed hydraulic cylinders having reciprocable cylinder rods extending therefrom.

* * * * *